United States Patent
Hsu et al.

(10) Patent No.: US 8,792,420 B2
(45) Date of Patent: Jul. 29, 2014

(54) MULTIMEDIA COMMUNICATION USING CO-LOCATED CARE OF ADDRESS FOR BEARER TRAFFIC

(75) Inventors: Raymond Tah-Sheng Hsu, San Diego, CA (US); Arungundram C. Mahendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 13/038,174

(22) Filed: Mar. 1, 2011

(65) Prior Publication Data

US 2011/0153843 A1   Jun. 23, 2011

Related U.S. Application Data (63) Continuation of application No. 11/104,957, filed on Apr. 12, 2005, now Pat. No. 7,924,771.

(60) Provisional application No. 61/561,955, filed on Apr. 13, 2004.

(51) Int. Cl.
| | |
|---|---|
| H04W 4/00 | (2009.01) |
| H04L 12/66 | (2006.01) |
| H04W 72/04 | (2009.01) |
| H04W 84/12 | (2009.01) |
| H04L 12/64 | (2006.01) |

(52) U.S. Cl.
CPC .............. *H04W 72/04* (2013.01); *H04W 84/12* (2013.01); *H04L 12/64* (2013.01)
USPC ............................ 370/328; 370/338; 370/352

(58) Field of Classification Search
CPC ..... H04W 72/04; H04W 88/08; H04W 76/00; H04W 84/12; H04W 80/04; H04W 84/18; H04W 88/06; H04W 74/08; H04L 2012/64; H04L 12/64; H04L 65/102; H04L 29/06176
USPC ........... 370/338, 349, 328, 469, 352; 709/245
See application file for complete search history.

(56) References Cited

U.S. PATENT DOCUMENTS

| | | | |
|---|---|---|---|
| 5,884,175 A | 3/1999 | Schiefer et al. | |
| 5,930,786 A | 7/1999 | Carino, Jr. et al. | |

(Continued)

FOREIGN PATENT DOCUMENTS

| | | |
|---|---|---|
| EP | 1089580 A2 | 4/2001 |
| JP | 2003234759 A | 8/2003 |
| JP | 2004056255 A | 2/2004 |
| WO | WO03085540 | 10/2003 |

OTHER PUBLICATIONS

3rd Generation Partnership Project 2, AII-IP Core Network Multimedia Domain, IP Multimedia Subsystem, Stage 2: TIA-873-002 (3GPP2 X,S0013-002-0 v1.0), Dec. 2003.

(Continued)

*Primary Examiner* — Steven H Nguyen
(74) *Attorney, Agent, or Firm* — Kristine U. Ekwueme (57) ABSTRACT

In a wireless communications system in which a mobile node seeks a communication session with a correspondent node by first signaling for initialization of the communication session through a first data path via an intermediate node. Thereafter, contents of the communication is established through a second data path in which the mobile node and the correspondent node communicate straightforwardly without going through the intermediate node.

25 Claims, 4 Drawing Sheets

(56) References Cited

U.S. PATENT DOCUMENTS

| | | | |
|---|---|---|---|
| 6,330,243 B1 | 12/2001 | Strandberg | |
| 6,510,153 B1 | 1/2003 | Inoue et al. | |
| 6,839,337 B2* | 1/2005 | Newberg et al. | 370/338 |
| 6,879,600 B1 | 4/2005 | Jones et al. | |
| 6,990,339 B2* | 1/2006 | Turanyi et al. | 455/432.1 |
| 6,992,994 B2 | 1/2006 | Das et al. | |
| 6,992,995 B2* | 1/2006 | Agrawal et al. | 370/328 |
| 7,027,400 B2 | 4/2006 | O'neill | |
| 7,042,879 B2 | 5/2006 | Eschbach et al. | |
| 7,079,499 B1 | 7/2006 | Akhtar et al. | |
| 7,080,151 B1 | 7/2006 | Borella et al. | |
| 7,082,118 B1* | 7/2006 | Sethi | 370/349 |
| 7,123,598 B1 | 10/2006 | Chaskar | |
| 7,193,987 B2* | 3/2007 | Vilander | 370/338 |
| 7,228,133 B2 | 6/2007 | Rink et al. | |
| 7,230,951 B2 | 6/2007 | Mizell et al. | |
| 7,272,650 B2 | 9/2007 | Elgebaly et al. | |
| 7,277,434 B2* | 10/2007 | Astarabadi et al. | 370/389 |
| 7,286,520 B2* | 10/2007 | Takeda et al. | 370/349 |
| 7,296,091 B1 | 11/2007 | Dutta et al. | |
| 7,328,281 B2* | 2/2008 | Takeda et al. | 709/246 |
| 7,330,453 B1* | 2/2008 | Borella et al. | 370/338 |
| 7,333,482 B2 | 2/2008 | Johansson et al. | |
| 7,337,405 B2 | 2/2008 | Weng et al. | |
| 7,356,344 B2 | 4/2008 | Sato | |
| 7,359,724 B2 | 4/2008 | Torvinen | |
| 7,372,840 B2* | 5/2008 | Le et al. | 370/338 |
| 7,388,850 B2 | 6/2008 | Ochi et al. | |
| 7,388,851 B2 | 6/2008 | Trossen | |
| 7,418,596 B1 | 8/2008 | Carroll et al. | |
| 7,483,697 B2 | 1/2009 | Ohki | |
| 7,542,481 B2* | 6/2009 | Faccin et al. | 370/469 |
| 7,603,594 B2* | 10/2009 | Inoue et al. | 714/712 |
| 7,764,640 B2* | 7/2010 | Lee et al. | 370/328 |
| 7,801,953 B1* | 9/2010 | Denman et al. | 709/204 |
| 7,924,771 B2 | 4/2011 | Hsu et al. | |
| 7,974,269 B2* | 7/2011 | Takeda et al. | 370/352 |
| 2002/0065944 A1 | 5/2002 | Hickey et al. | |
| 2002/0075305 A1 | 6/2002 | Beaton et al. | |
| 2002/0075844 A1 | 6/2002 | Hagen | |
| 2002/0103898 A1 | 8/2002 | Moyer et al. | |
| 2003/0009565 A1 | 1/2003 | Arao | |
| 2003/0050051 A1* | 3/2003 | Vilander | 455/414 |
| 2003/0074452 A1* | 4/2003 | Zheng et al. | 709/228 |
| 2003/0137962 A1* | 7/2003 | Tsirtsis et al. | 370/338 |
| 2003/0212764 A1 | 11/2003 | Trossen et al. | |
| 2003/0225912 A1* | 12/2003 | Takeda et al. | 709/246 |
| 2004/0003046 A1 | 1/2004 | Grabelsky et al. | |
| 2004/0028055 A1* | 2/2004 | Madour et al. | 370/395.21 |
| 2004/0034708 A1 | 2/2004 | Pelletier et al. | |
| 2004/0095932 A1* | 5/2004 | Astarabadi et al. | 370/389 |
| 2004/0105420 A1* | 6/2004 | Takeda et al. | 370/349 |
| 2004/0122976 A1* | 6/2004 | Dutta et al. | 709/245 |
| 2004/0165594 A1* | 8/2004 | Faccin et al. | 370/395.2 |
| 2004/0187021 A1 | 9/2004 | Rasanen | |
| 2004/0196978 A1 | 10/2004 | Godfrey et al. | |
| 2005/0058068 A1 | 3/2005 | Ben Ali et al. | |
| 2005/0117556 A1* | 6/2005 | Lee et al. | 370/338 |
| 2005/0138179 A1 | 6/2005 | Encarnacion et al. | |
| 2005/0144321 A1 | 6/2005 | Forsberg | |
| 2005/0165917 A1 | 7/2005 | Le et al. | |
| 2005/0213545 A1 | 9/2005 | Choyi et al. | |
| 2006/0059267 A1 | 3/2006 | Cugi et al. | |
| 2007/0118660 A1 | 5/2007 | Garcia-Martin | |
| 2007/0146475 A1* | 6/2007 | Inoue | 348/14.01 |
| 2007/0165559 A1 | 7/2007 | Seguchi et al. | |

OTHER PUBLICATIONS

3rd Generation Partnership Project 2, IP Multimedia Call Control Protocol Based on Sip and SDP, Stage 3: TIA-873.004 3GPP2: X.S0013-004-0 v1.0), Dec. 2003.

3rd Generation Partnership Project: Technical Specification Group Services and System Aspects, IP Multimedia Subsystem (IMS), Stage 2, 3GPP TS 23.228, V6.0.0. Release 6, Mar. 2005.

3rd Generation Partnership Project; Technical Specification Group Core Network: End-to-end Quality of Service (QoS) Signaling Flows, 3GPP TS 29.208, V6.3.0, Release 6, Mar. 2005.

3rd Generation Partnership Project; Technical Specification Group Services and System Aspects: Quality of Service (QoS) concept and architecture, 3GPP TS 23.107, v6.2.0, Release 6, Dec. 2004.

Choi et al., "A new multimedia network architecture using 3G CDMA2000," Vehicular Technology Conference, 52nd, vol. 6, Sep. 24, 2000, pp. 2937-2944, XP010525116.

Handley, M. et al., "SDP: Session Description Protocol" Network Working Group, Request for Comments: 2327, Category: Standards Track. ISI/LBNL, Apr. 1998, pp. 1-42.

International Preliminary Report on Patentability, PCT/US05/012526, IPEA, US, Jul. 11, 2007.

International Search Report, PCT/US05/012526, International Searching Authority, European Patent Office, Aug. 22, 2005.

Lee et al., "Mobility Management Based on the Integration of Mobile IP and Session Initiation Protocol in Next Generation Mobile Data Networks," IEEE Vehicular Technology Conference, Orlando, Florida, Oct. 6, 2003, pp. 2058-2062, XP01073058.

Written Opinion, PCT/US05/012526, International Searching Authority, European Patent Office, Aug. 22, 2005.

Taiwan Search Report—TW094111707—TIP0—Aug. 3, 2011.

Takeda, et al.,"Service Procedure Using Mobile IP and SIP", Report of the Institute of Electronics, Information and Communication Engineers, vol. 102, No. 458, The Institute of Electronics, Information and Communication Engineers, Nov. 14, 2002, p. 41-44.

Tamura, Toshihiko, et al., "A Study of Priority Control Mechanism in Mobile IPv6 Networks," IEICE Technical Report, The Institute of Electronics, Information and Communication Engineers, Japan, Jul. 2003, vol. 103, No. 201, pp. 71-74.

* cited by examiner

MULTIMEDIA COMMUNICATION USING CO-LOCATED CARE OF ADDRESS FOR BEARER TRAFFIC

CLAIM OF PRIORITY UNDER 35 U.S.C §119

The present Application for Patent claims priority to U.S. Provisional Application No. 60/561,955, entitled "Service Based Policy for Mobile IP Co-location Care of Address," filed Apr. 13, 2004, and is a continuation of U.S. patent application Ser. No. 11/104,957 filed Apr. 12, 2005, entitled "Multimedia Communication Using Co-Located Care of Address for Bearer Traffic," now allowed, assigned to the assignee hereof and expressly incorporated by reference herein.

BACKGROUND

I. Field

The present invention generally relates to packet data communications, and more particularly, to wireless multimedia packet data communications using separate communication paths for signaling and for content transmitting.

II. Background

Figure 1:
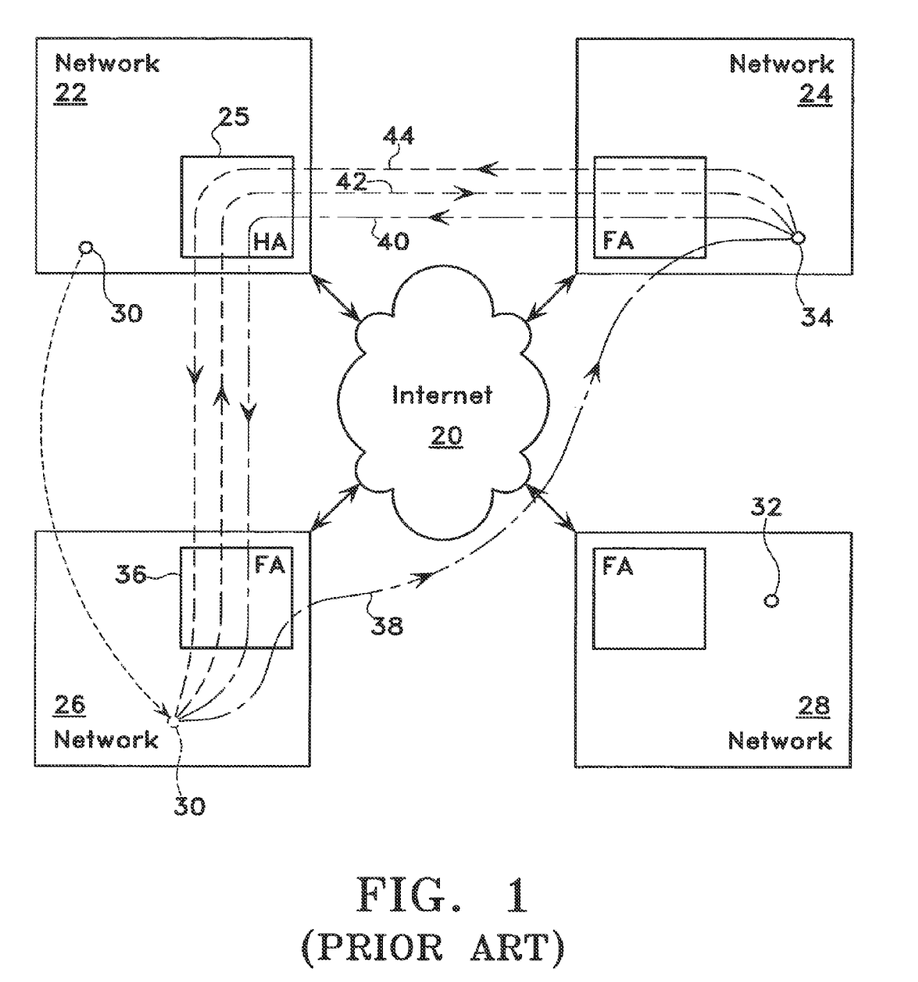
FIG. 1 is a schematic drawing of the global connection of networks.

Interconnecting of networks globally allows information to be swiftly accessed irrespective of geographical distances. FIG. 1 shows a simplified schematic drawing of the global connection of networks, commonly referred to as the Internet signified by the reference numeral 20. The Internet 20 is in essence many networks with different levels of hierarchy linked together. The Internet 20 is operated under the IP (Internet Protocol) promulgated by the IETF (Internet Engineering Task Force). Details of the IP can be found in RFC (Request For Comments) 791 published by the IETF.

Connected to the Internet 20 are various individual networks, sometimes called LANs (Local Area Networks) or WANs (Wide Area Networks) depending on the network sizes. Shown in FIG. 1 are some of such networks 22, 24, 26 and 28 tied to the Internet 20.

Within each of the networks 22, 24, 26 and 28, there can be various pieces of equipment connected to and in communication with each other. Examples are computers, printers, and servers, to name just a few. Each piece of equipment has a unique hardware address, commonly called the MAC (Media Access Control) address. The piece of equipment with the MAC address is sometimes called a node. When the node communicates beyond its own network via the Internet 20, an IP address needs to be assigned to the node.

The assignment of the IP address can be manual or automatic. The manual assignment of the IP address can be performed by a network administrator, for example. More often, the IP address is automatically assigned. For instance, in a LAN, the IP address can be assigned by a server called the DHCP (Dynamic Host Control Protocol) server residing inside in the node's LAN. In a WAN which supports wireless technologies, IP address can even be assigned automatically and remotely.

Returning now to FIG. 1, as an example, suppose a node 30 in the network 22 attempts to send a data packet to another node 32 in the network 28. Under the IP, each data packet needs to have a source address and a destination address. In this case, the source address is the address of the node 30 in the network 22, and the address is called the HoA (Home Address). The destination address is the address of the node 32 in the network 28.

As another example, when the node 30 in the network 22 tries to retrieve information from the node 34 in another network 24, such as in a web hosting session in which the node 34 serves as a web server, the node 30 must provide a proper IP address of the node 34 in the network 24 for such a session.

Advent in wireless technologies allows nodes to move away from their originally registered network to another network. For instance, referring back to FIG. 1, the node 30, instead of permanently wired to the network 22, can be a wireless device, such as a PDA (Personal Device Assistant), a cellular phone, or a mobile computer. The wireless node 30 can travel beyond the boundary of its home network 22. Thus, for instance, the node 30 may roam away from its home network 22 to a foreign network 26. Under such scenario, the original HoA assigned to the node 30 would no longer be applicable to the node 30. As such, data packets destined to the HoA of the node 30 may not be reachable to the node 30.

The MIP (Mobile Internet Protocol) set forth by the IETF is intended to address the node mobility problems. In accordance with the RFC 2002 published by the IETF, whenever away from the home network 22 and roaming in another network, the node 30 is assigned a "care-of address," abbreviated as CoA (Care-of Address). Under the RFC 2002, there are two types of CoA, namely, the FA CoA (Foreign Agent Care-of Address) and the CCoA (Co-located Care of Address).

The FA CoA is in essence the address of a FA (Foreign Agent) which is a designated server in the foreign network where the node 30 is located at.

The CCoA is an individual but temporary address assigned to the node 30 by the foreign network.

In any case, anytime the node 30 is in a foreign territory, the node 30 must register the CoA, be it the FA CoA or the CCoA, with its home network 22, so that the home network 22 always knows the whereabouts of the node 30. After registration, the CoA is stored in the routing table maintained by a designated server, called the HA (Home Agent) 25 of the home network 22.

Take a couple of examples for illustration.

For the case of the FA CoA, suppose the node 30 roams into the foreign network 26. Upon reaching the territorial limit of the foreign network 26, the node receives an advertisement message from the foreign network 26 informing the node 30 of its presence in the foreign territory. From the advertisement message, the node knows the address of the FA 36 of the foreign network 26. The node 30 then registers the FA CoA with the HA 25 in the home network 22.

When the node 30 in the foreign network 26 sends out a data packet to the node 34 in the network 24, for example, knowing the address of the node 34 in the network 24, the data packet can be sent straightforwardly. That is, in accordance with the IP, in the data packet, the source address can be set to the HoA of the node 30 and the destination address can be set to the address of the node 34 in the network 24. The direction of the data packet is shown as data path 38 shown in FIG. 1.

As for the reverse data traffic, it is not as straightforward. In the reverse data route, when the node 34 in the network 24 attempts to send a data packet to the node 30, now in the foreign network 26, as mentioned above, in conformance with the IP, both the source and the destination addresses must be specified in the data packet. In this case, the source address is the IP address of the node 34 in the network 24. As for the destination address, the node 34 only knows the HoA of the node 30, not the FA CoA of the node 30. Thus, the destination address will be set to the HoA of the node 30. Nevertheless, since the FA CoA of the node 30 is stored in the routing table of the HA 25 in the home network 22, when the data packet reaches the home network 22, the HA 25 of the network 22 encapsulates the received data packet with the stored FA CoA and sends it to the node 30 in the foreign network 26. That is, the encapsulated data packet utilizes the FA CoA as the destination address. Once the foreign network 26 receives the encapsulated data packet, the FA 36 merely strips away the encapsulated FA CoA and delivers the original packet to the mobile node 30. The route of the data packet is shown as data path 40 in FIG. 1.

It also be noted that the data paths, such as paths 38 and 40, in reality pass through the Internet 20 many times. For the sake of clarity so as not to obscure FIG. 1, the paths merely are shown as passing through the relevant servers, such as the HA 25 and the FA 36. That is, the data paths 38 and 40 are shown as logical paths as shown in FIG. 1.

Operating in the manner as described above, the mobile node is said to be communicating with the correspondent node 34 under the MIP using FA CoA.

As for the case of the CCoA, when the node 30 roams away from the home network 22, instead of requesting for a FA CoA, the node 30 can instead request a CCoA via a DHCP server in any foreign network where the node 30 is located at, for example. It should be noted that, if the network 26 is a WAN supporting wireless technologies such as the cdma2000 standards promulgated by the TIA/EIA (Telecommunications Industry Association/Electronic Industries Association), the CCoA can be requested and assigned remotely by the foreign network 26 via a PPP (Point to Point Protocol) as set forth in the MIP. However, other than the assignment of the CCoA by the foreign network 26, the node 30 performs all the functions of a foreign agent, such as the FA 36. Again, the MN 48 needs to register the CCoA with the HN 44.

For instance, to correspond with node 34 in the network 24, the node 30 sends out a data packet with two layers of addresses. In the outer layer, the source address is set as the CCoA, and the destination address is set as the HA 25. In the inner layer, the source address is the HoA of the node 30 and the destination address is the address of the node 34 in the foreign network 24. Upon receipt of the data packet from the roaming node 30, the HA 25 strips off the outer address layer and sends the data packet to the node 34 with the inner address layer. The logical path of the data packet is shown as data path 42 in FIG. 1.

In the reverse data path, that is, when the node 34 sends a data packet to the node 30, the data packet has only one address layer with the source address set to the node 34 and the destination address set to the HoA of the node 30. Upon receipt of the data packet, the HA 25 encapsulates the data packet with the CCoA as the destination address and the address of the HA 25 as the source address and sends the encapsulated data packet to the node 30. The node 30 performs the de-encapsulating on its own without going through the FA 36. The direction of the data packet is shown as data path 44 in FIG. 1.

Operating in the manner as described above, the roaming node 30 is said to be communicating with the correspondent node 34 under the MIP using the CCoA.

Irrespective of whether the node 30 uses the FA CoA or the CCoA, to communicate with other networks under the MIP while the node 39 is roaming, there are considerable traffic detours of data paths as exemplified by the logical data paths 40, 42, and 44 shown in FIG. 1. That is, data packets have to pass through intermediate networks before reaching the destination. Such traffic detours do not pose much of a problem in certain types of data, such as data in a file transfer. Under the TCP (Transmission Control Protocol) as set forth in the RFC 793, the data packets merely take a longer time to reach the destination. It is also well known that data packets passing through longer data paths are more susceptible to transmission errors. Nevertheless, the defective packets can always be resent, albeit further slowing down the overall data transmission process. However, for other types of data, such as in an audio or video call, accurate access of real-time information is of significant importance. Excessive detours of data routes introduce additional latency during the data delivery processes. Furthermore, for data packet sent under the UDP (User Datagram Protocol) as set forth in the RFC 768, erroneous packets are not normally re-transmitted but simply dropped. As a consequence, quality of service can be undermined.

Accordingly, there is need to provide better real-time data access in a wireless communication system.

SUMMARY

In a communication system in which a mobile node seeks a communication session with a correspondent node by first signaling for initialization of the communication session through a first data path via an intermediate node. Thereafter, contents of the communication session is established through a second data path in which the mobile node and the correspondent node communicate straightforwardly without going through the intermediate node.

In accordance with one embodiment, the mobile node roams from its home network to a foreign network. Using a first address, the mobile node signals for initiation of the communication session with the correspondent node via a home agent in the home network. The home agent in turn relays the initiation signaling to the correspondent node locating at a remote network. Upon acceptance by the correspondent node, the mobile node uses a second address to transmit contents of the communication session straightforwardly through a direct data path between the mobile node and the correspondent node, without passing through the home agent. Consequently, with the shorter data path, transmission latency and transmission errors are curtailed, resulting in higher quality of service. These and other features and advantages will be apparent to those skilled in the art from the following detailed description, taken together with the accompanying drawings, in which like reference numerals refer to like parts.

DETAILED DESCRIPTION

The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well-known structures and processes are not elaborated in order not to obscure the description of the invention with unnecessary details. Thus, the present invention is not intended to be limited by the embodiments shown, but is to be accorded with the widest scope consistent with the principles and features disclosed herein.

The embodiments described below are operable according to the IMS/MMD (IP Multimedia Subsystem/Multimedia Domain) standards promulgated by the $3^{rd}$ Generation Partnership Project (3GPP) and the $3^{rd}$ Generation Partnership Project 2 (3GPP2). A general discussion of the IMS/MMD can be found in published documents, entitled "$3^{rd}$ *Generation Partnership Project: Technical Specification Group Services and System Aspects, IP Multimedia Subsystem (IMS), Stage 2*," 3GPP TS 23.228 "$3^{rd}$ *Generation Partnership Project: Technical Specification Group Core Network, End-to-end Quality of Service (QoS) Signaling Flows*," 3GPP TS 29.208; and "*IP Multimedia System, Stage 2*," TIA-873-002 and 3GPP2 X.P0013-012.

IMS is applicable in a wide variety of standards such as the cdma2000 by the TIA/EIA, WCDMA by the 3GPP, and various other WANs.

Figure 2:
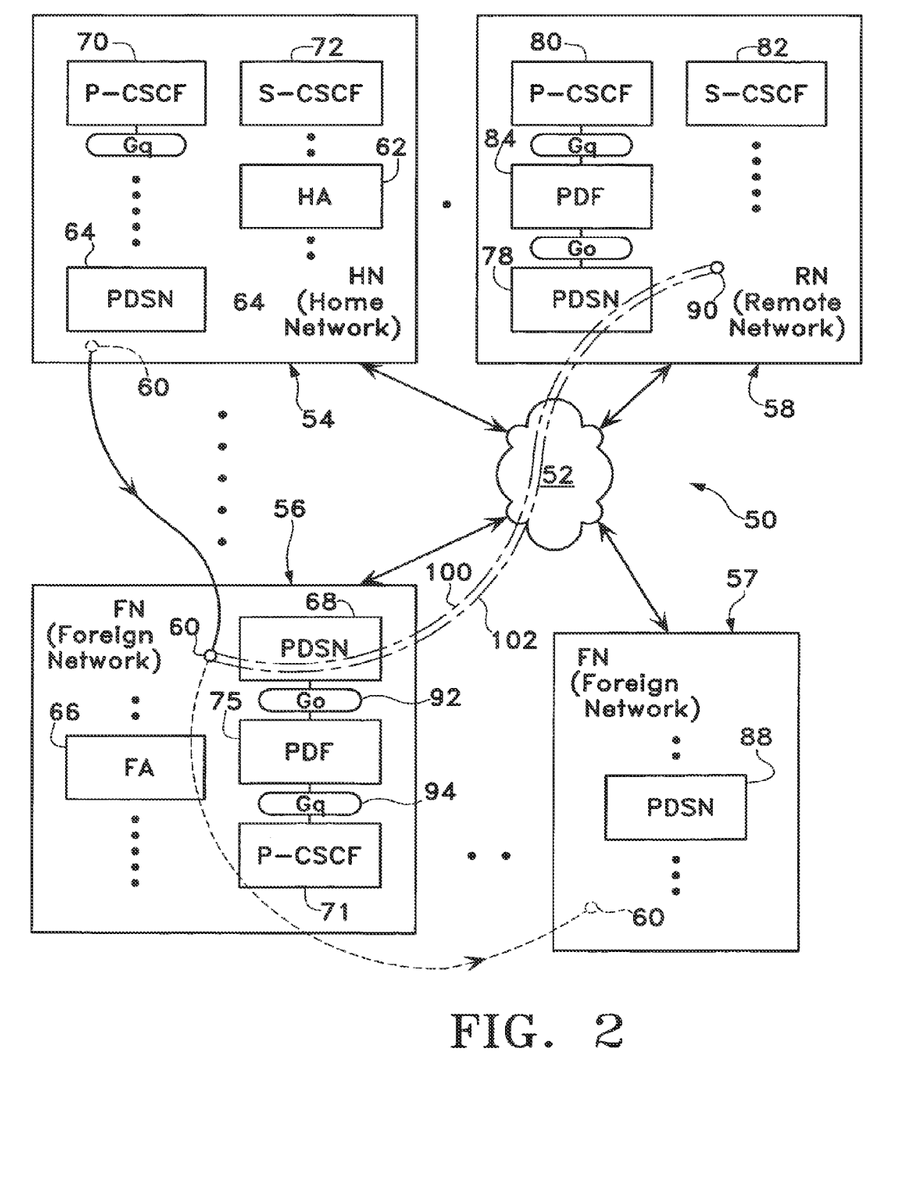
FIG. 2 is a schematic drawing showing an embodiment of the invention.

Reference is now directed to FIG. 2 which schematically shows an exemplary embodiment of the invention. The overall system is generally signified by the reference numeral 50 which includes a backbone network 52, such as an intranet or the Internet.

By way of example, as shown in FIG. 2, connected to the backbone network 52, among other networks, are a HN (Home Network) 54, a FN (Foreign Network) 56, another FN 57, and a RN (Remote Network) 58.

In the HN 54, there is a HA (Home Agent) 62 which assumes the duty of managing data traffic within the HN 54 and also for controlling the data traffic of the HN 54 for inbound and outbound routing. Furthermore, there is a PDSN (Packet Data Serving Node) 64 which in essence is an access gateway between the backbone network 52 and the radio access portion of the HN 54.

To execute the various IMS/MMD functions and features, service providers installed different servers in the HN 54. Examples of such servers include a P-CSCF (Proxy Call State Session Function) server 70, and a S-CSCF (Serving Call State Session Function) server 72. The functional description of these servers will be depicted later along with the operational illustration of the system 50.

In addition to the nodes described above, there are other nodes within the HN 54 but are not shown for purpose of clarity. Such nodes can be computers of various scales, printers, and any other devices which can be mobile or non-mobile.

Shown in FIG. 2 are FNs 56 and 57 linked to the backbone network 52. Furthermore, for simplicity and ease of explanation, the FN 56 and the RN 58 are illustrated as somewhat similar to the HN 54. It should be appreciated that, depending on usage, the FN 56 and RN 58 can be structured very differently. Thus, in this case, the FN 56 also includes, among other things, a FA (Foreign Agent) 66, a PDSN 68, a P-CSCF 71, and a PDF (Policy Decision Function) 75. Likewise, the RN 58 also includes, among other things, a PDSN 78, a P-CSCF 80, a S-CSCF 82, and a PDF 84.

In the system 50, there is a MN (Mobile Node) 60 which is originally registered with the HA 62 in the HN 54 with a HoA (Home Address). The MN 60 is capable of migrating to other foreign networks, such as the FN 56 or the FN 57, and can gain access to the backbone network 52 via the FN 56 or the FN 57 under the MIP (Mobile Internet Protocol).

Suppose the MN 60 is roaming in the FN 56. In this specific example, assume the user of the MN 60 wants to have a video conferencing session with a another user operating a CN (Correspondent Node) 90 in the RN 58. The node 90 can be mobile or non-mobile.

Conventionally, upon reaching the territory of the FN 56, the MN 60 acquires the address of the FA 66 via advertisement by the FN 56. The MN 60 then registers the FA CoA with the HA 62 in the HN 54 so that the HA 62 can keep track of the locality of the MN 60.

Thereafter, the MN 60 in the FN 56 sends a message to the P-CSCF 70 in the HN 54 to initiate the conferencing session. The initial signaling path for the request starts from the FN 56 to the HN 54 before reaching the RN 58. Likewise, if the conferencing session request is approved, the response signaling path is the reverse of the request path, that is, from the RN 58, to the HN 54 and then the FN 56. Upon approval of the request, the bearer traffic, that is, the traffic of the media flow which contains the audio and video contents of the conferencing session propagates more or less along the directions of the signaling paths. That is, the logical path of the bearer traffic flows from MN 60 in the FN 56, and then to the HA 62 in the HN 54 and finally to the RN 58 before reaching the CN 90, and vice versa. As mentioned above, such meandering of data traffic adds latency to the packet data. Furthermore, transmission errors are also more prone to occur.

In the embodiment described below, a different approach is adopted. The data paths for the bearer traffic are chosen to be substantially different from the session initiation signaling paths.

With reference to FIG. 2, to begin with, suppose the MN 60 roams away from the HN 54 toward the FN 56. Upon reaching the territory of the FN 56, the MN 60 receives an advertisement message from the FN 56. From the message, the MN MN 60 derives the address of the FA 66. Thereafter, the MN 60 reports back to the HN 54 by registering the address of the FA 66 with the HA 62. The registered address is called the FA CoA which is stored in the routing table of the HA 62 in the HN 54.

Again, suppose the user of the MN 60 wants to have a video conferencing session with the user of the CN 90 in the RN 58.

First, the MN obtains a CCoA from the FN 56. Using the HoA originally assigned by the HA 62 in the HN 54, the MN 60 registers the CCoA with the HA 62 in the HN 54. The MN 60 also registers with the S-CSCF 72 in the HN 54 using the HoA for the access of the SIP (Session Initiation Protocol) network in the HN 54.

The MN 60 then sends a SIP INVITE message to the P-CSCF 70 in the HN 54. It should be noted that in actual operation, as with all other data traffic, the SIP INVITE message first goes through the PDSN 68 and the HA 62 before routing to the P-CSCF 70. Furthermore, as well known in the art, the data traffic is in the form of electrical signals via a carrier wave traveling through the system 50. For the sake of clarity in a manner similarly described above, the data traffic is illustrated as logical paths. That is, in the following description, unless specifically highlighted, only the logical paths of the data traffic are depicted.

It further should be noted that the MN 60 can send the SIP INVITE message to the P-CSCF 71 in the FN 56 to initiate the conferencing session as an alternative. For conciseness in explanation, in the following description, the P-CSCF 70 in the HN 54 is used for the conference session initiation.

Returning to FIG. 2, the SIP INVITE message includes a description portion called the SDP (Session Description Protocol) which in essence describes the basic requirements for the proper execution of the requested video conferencing session. For instance, included in the SDP are the IP address and port numbers of the MN 60, and the codec specification for the session. More importantly, in this embodiment, the SDP includes the CCoA of the MN 60 for the media flow, that is the bearer traffic.

The P-CSCF 70 in the HN 54 is a node assuming the duty of call session management. Upon receipt of the SIP INVITE message, the P-CSCF 70 generates a token unique to the requested session. The P-CSCF 70 then forward the SIP INVITE message to the S-CSCF 72 in the HN 54. The C-CSCF 72 in turn sends the SIP INVITE message to the RN 58 for request of acceptance.

Upon approval of the session by the S-CSCF 72 and the acceptance of the conferencing session by the CN 90 in the RN 58, the P-CSCF 70 sends the token to the MN 60. With the token in hand, the MN 60 in turn sends the token along with the requested QoS (Quality of Service) to the PDSN 68 in the FN 56 to set up the bearer traffic, that is, the media flow of audio and video signals of the conferencing session.

The PDSN 68 then requests the authorized QoS for the conferencing session from the PDF 75, which then relays the request to the P-CSCF 70 in the HN 54. Any parameters granted by the PDF 75 have to be in conformance with certain mandated polices. Such policies may include rules dictated under the IMS/MMD standards, specific agreements among networks, such as agreements between the HN 54 and the FN 56 relating to the handling of the bearer traffic, policies particular to a network, such as policies unique only to the FN 56.

The PDF 75 is installed for the decision of all the imposed polices. In the decision process, the PDF 75 is interposed between the P-CSCF 71 and the PDSN 68 in the FN 56. Furthermore, there is a Go interface 92 interposed between the PDSN 68 and the PDF 75. There is yet another Gq interface 94 disposed between the PDF 75 and the P-CSCF 71. The Go and Gq interfaces 92 and 94 are used for policy control between the conferencing session and the bearer traffic. Details of the Go and Gq interfaces can be found in the documents, 3GPP TS 23.107 published by 3GPP, and 3GPP2 X.P0013-012 published by 3GPP2.

Returning now to FIG. 2, the requested session parameters, if authorized, are passed to the PDSN 68 from the P-CSCF 70 and the PDF 75.

In this embodiment, the CN 90 is assumed to have a CCoA which is assigned by the RN 58. Thus, upon receipt of the SIP INVITE messages, the CN 90 responds back with a SIP 200 OK message. The SIP 200 OK message basically reaffirms the parameters of the original SIP INVITE message. The SIP 200 OK follows the same data path as the SIP INVITE message but in the reverse order.

The MN 60 then confirms the receipt of the SIP 200 OK message by sending an acknowledge message (ACK) back along the same data path as the original SIP INVITE MESSAGE.

Bearer traffic is thereafter established by the PDSN 68 in the FN 56 in accordance with the authorized parameters as set forth in the SIP INVITE message. In FIG. 2, the bearer data paths are shown as the video path 100 and the audio path 102 directly linking the nodes 60 and 90 via their respective CCoA addresses. The bearer traffic in the manner as described can sometimes be labeled as establishing data traffic using the CCoA under the simple IP, as different from the data paths 42 and 44 in which the data paths are said to be set up using the CCoA under the MIP, as shown and described in FIG. 1.

In this embodiment, in the SIP INVITE, to specify the proper traffic flow, both the MN 60 and the CN 90 use their corresponding CCoAs. The CCoA of the CN 90 can be assigned by the PDSN 78 of the RN 58, for example. The CCoA of the MN 60 is assigned by and via a request to the PDSN 68 in the FN 56, for instance. A CCoA acquired in the manner as aforementioned is very often referred to as the "simple IP address."

Figures 3, 4:
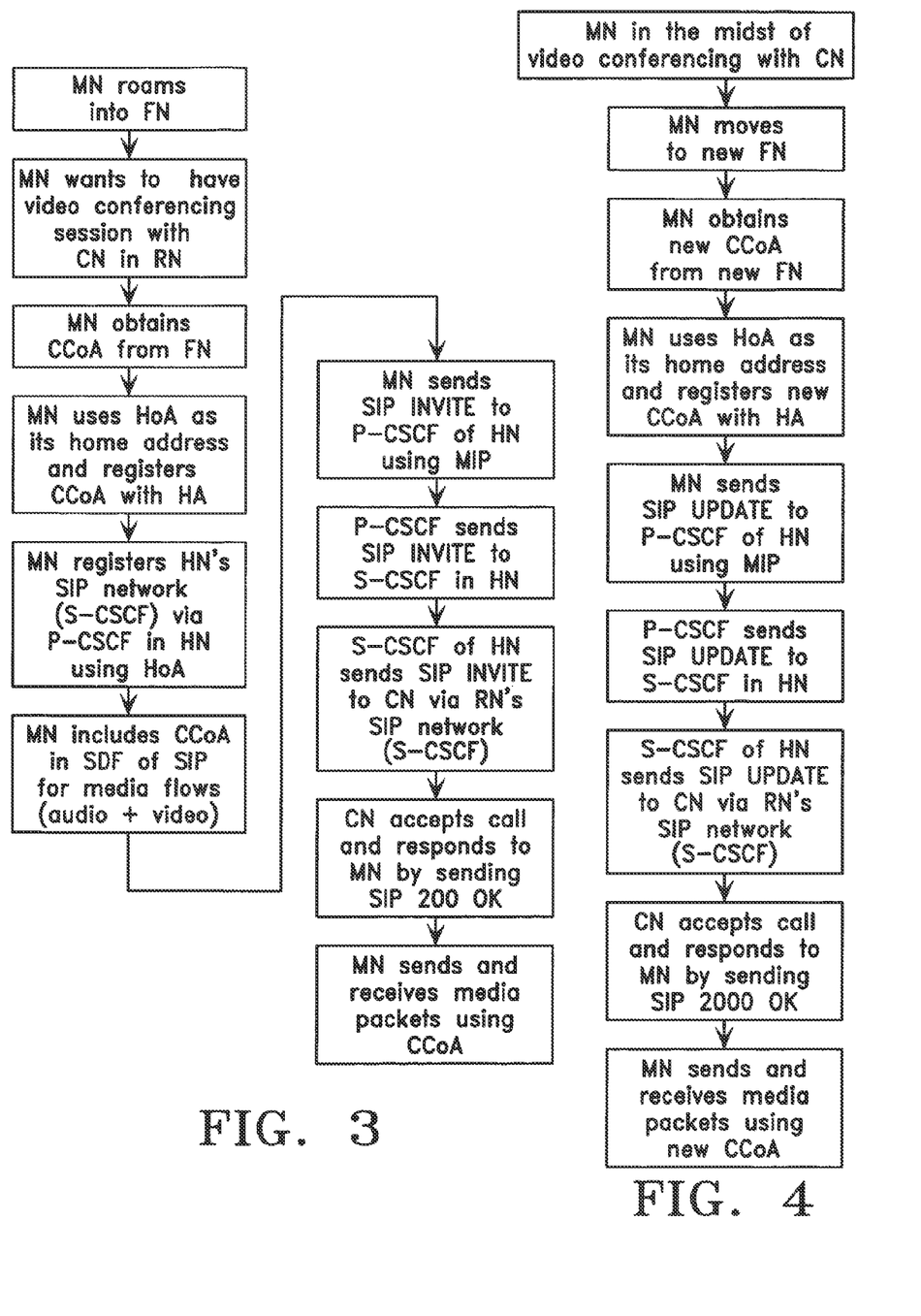
FIG. 3 is a flowchart showing the steps for initiation signaling and establishing content traffic in accordance with the embodiment of the invention.
FIG. 4 is a flowchart showing the steps of continuating with the content flow by the process of update signaling in accordance with the embodiment of the invention.

The process as stated above is shown in the flowchart of FIG. 3.

When the MN 60 roams to yet another network away from the FN 56, for instance, to the FA 57, the MN 60 obtains a new CCoA from the new FN 57. Thereafter, the MN 60 registers the new CCoA with the HA 62 in the HN 54. Since the MN 60 has previously used the HoA to register with the S-CSCF 72, the MN need not perform another SIP registration. In this embodiment, the MN 60 merely sends a SIP UPDATE message with the new CCoA to the CN 90 in a manner substantially similar to the sending of the SIP INVITE message as previously described. For the sake of conciseness, the logical flow of the SIP UPDATE message is not further repeated here, but is shown in the flowchart of FIG. 4.

Reference is now returned to FIG. 2. Once the bearer traffic identified by the data paths 100 and 102 is established, in accordance with the IMS standards, the PDSN 68 enforces a set of policies called the SBBC (Service Based Bearer Control) under the directions of the PDF 75. The enforcement of the SBBC is continuous until the session between the MN 60 and the CN 90 is terminated.

The policies include in the SBBC can be, among other things, authorization of the requested QoS for the session, charging of the individual bearer flows, and policing of bearer traffic. To meet this end, the PDSN 68 monitors the media flow in the bearer paths 100 and 102. The operational details of the SBBC can be found in the document entitled, "3*GPP2 MMD Service Based Bearer Control Document, Work in Progress,*" 3GPP2 X.P0013-012. Descriptions of the SDP can be found in the document, entitled "IP Multimedia Call Control Protocol Based on Sip and SDP), Stage 3: TIA-873-004; and RFC 2327.

Operating in the manner as described above, contents of the media flow can be sent and received straightforwardly as identified by the bearer traffic paths 100 and 102 shown in FIG. 2. Unnecessary detours of the data paths can be curtailed, resulting in faster and more accurate real-time data access.

Figure 5:
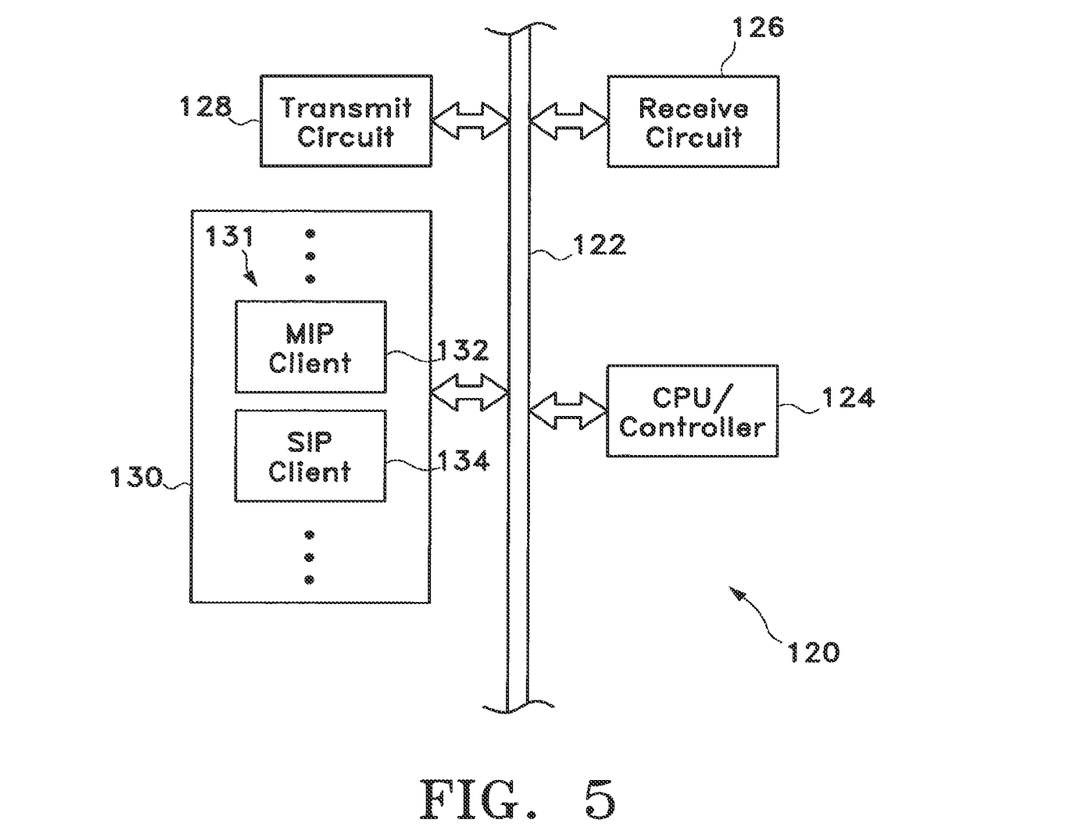
FIG. 5 is a schematic drawing of the circuitry of a mobile node configured in accordance with the invention.

FIG. 5 schematically shows the part of the hardware implementation of a mobile node apparatus signified by the reference numeral 120 in accordance with the invention. The apparatus 120 can be built and incorporated in various devices, such as a laptop computer, a PDA (Personal Digital Assistant) or a cellular phone.

The apparatus 120 comprises a central data bus 122 linking several circuits together. The circuits include a CPU (Central Processing Unit) or a controller 124, a receive circuit 126, a transmit circuit 128, and a memory circuit 130.

The receive and transmit circuits 126 and 128 can be connected to a RF (Radio Frequency) circuit but is not shown in the drawing. The receive circuit 126 processes and buffers received signals before sending out to the data bus 122. On the other hand, the transmit circuit 128 processes and buffers the data from the date bus 122 before sending out of the device 120. The CPU/controller 124 performs the function of data management of the data bus 122 and further the function of general data processing, including executing the instructional contents of the memory circuit 130.

The memory circuit 130 includes a set of instructions generally signified by the reference numeral 131. In this embodiment, the instructions include, among other things, portions such as the MIP client 132 and the SIP client 134. The SIP client 134 includes the instructional sets in accordance with the invention as described previously. The MIP client 132 includes the instructional sets for allowing the apparatus 120 to operate under the IP and the MIP, such as acquiring various types of addresses for various uses, also as described above.

In this embodiment, the memory circuit 130 is a RAM (Random Access Memory) circuit. The exemplary instruction portions 132 and 134 are software modules. The memory circuit 130 can be tied to another memory circuit (not shown) which can either be of the volatile or nonvolatile type. As an alternative, the memory circuit 130 can be made of other circuit types, such as an EEPROM (Electrically Erasable Programmable Read Only Memory), an EPROM (Electrical Programmable Read Only Memory), a ROM (Read Only Memory), a magnetic disk, an optical disk, and others well known in the art.

Finally, described in the embodiments are only few networks tied to a backbone network. It should be apparent that a multiplicity of networks can be involved. Furthermore, described in the embodiment, the node 60 is depicted as a mobile device roaming through different foreign networks. It should be understand that the corresponding network node 90 can be stationary. The node 90 can also be mobile, and when reaching another foreign network, performs procedures and status update in a manner similar to that required of the node 60. Moreover, the process of signaling for initiation of the communication session need not be confined to the use of the HoA as described in the embodiment. A CCoA can be used instead of the HoA in the signaling process. In addition, any logical blocks, circuits, and algorithm steps described in connection with the embodiments can be implemented in hardware, software, firmware, or combinations thereof. It will be understood by those skilled in the art that theses and other changes in form and detail may be made therein without departing from the scope and spirit of the invention.

What is claimed is:

1. A method of communicating with a correspondent node in a remote network in a communication system supported by IP (Internet Protocol), comprising:
   (a) sending, from a mobile node located in a foreign network, signaling for initialization of a communication session through a first communication path by sending an invite message to said correspondent node via a proxy entity associated with a home network of the mobile node, including sending the invite message via a home agent of the home network to a Proxy Call State Session Function (P-CSCF) of the home network; and
   (b) transmitting contents of said communication session straightforwardly from said mobile node to said correspondent node through a second communication path, wherein the second communication path comprises a direct data path between the mobile node and the correspondent node without passing through the proxy entity.

2. The method of claim 1 further including acquiring first and second addresses prior to step (a), and wherein step (a) further including signaling for initialization of said communication session using said first address and step (b) further including transmitting said contents of said communication session using said second address.

3. The method of claim 2 further including (c) updating said second address when the mobile node moves from the foreign network to another network in the communication system.

4. The method of claim 3 wherein step (a) further including signaling for initiation of said communication session under mobile IP and step (b) further including transmitting contents of said communication session under simple IP.

5. The method of claim 2 further including providing a home address as said first address and providing a co-located care-of address as said second address.

6. The method of claim 5 further including updating said co-located care of address during said transmitting said contents in a second foreign network.

7. The method of claim 1, wherein sending the invite message to said correspond node via the proxy entity further comprises sending via a Proxy Call State Session Function (P-CSCF) of the foreign network.

8. An apparatus in a wireless communication system supported by the IP (Internet Protocol), comprising:
   means for sending, from a mobile node located in foreign network, an invite message for initialization of a communication session to a correspondent node in a remote network via a proxy entity associated with a home network of the mobile node through a first communication path, including means for sending the invite message via a home agent of the home network to a Proxy Call State Session Function (P-CSCF) of the home network; and
   means for transmitting contents of said communication session straightforwardly from said mobile node to said correspondent node through a second communication path, wherein the second communication path comprises a direct data path between the mobile node and the correspondent node without passing through the proxy entity.

9. The apparatus of claim 8 further including means for acquiring first and second addresses, such that said apparatus uses said first address for sending said invite message through said first communication path and uses said second address for transmitting said contents of said communication session through said second communication path.

10. The apparatus of claim 9 further including means for updating said second address when said apparatus moves from the foreign network to another network in said wireless communication system.

11. The apparatus of claim 8 further including means for providing a home address as said first address and means for providing a co-located care-of address as said second address.

12. The apparatus of claim 11, further including means for updating said co-located care of address when said apparatus moves from the foreign network to another foreign network in said wireless communication system.

13. The apparatus of claim 11, further including means for sending said invite message under mobile IP and means for transmitting contents of said communication session under simple IP.

14. An apparatus for communication with a correspondent node in a remote network in a wireless communication system supported by the IP (Internet Protocol), comprising:
   a memory circuit having computer-readable instructions for, sending from a mobile node located in a foreign network, signaling for initialization of a communication session through a first communication path by sending an invite message to said correspondent node via a proxy entity associated with a home network of the mobile node, including sending the invite message via a home agent of the home network to a Proxy Call State Session Function (P-CSCF) of the home network, and transmitting contents of said communication session straightforwardly from said mobile node to said correspondent node through a second communication path, wherein the second communication path comprises a direct data path between the mobile node and the correspondent node without passing through the proxy entity; and a processor circuit coupled to said memory circuit for processing said computer-readable instructions.

15. The apparatus of claim 14 wherein said memory circuit further including computer-readable instructions for acquiring first and second addresses, and using said first and second addresses respectively in conjunction with said first and second communication paths.

16. The apparatus of claim 15 wherein said memory circuit further including computer-readable instructions for updating said second address when said apparatus moves from the foreign network to another network in said wireless communication system.

17. The apparatus of claim 15 wherein said first and second addresses respectively include a HoA (Home Address) and a CCoA (Co-located Care-Of Address).

18. The apparatus of claim 17 wherein said computer-readable instructions further including sending said invite message under mobile IP and transmitting contents of said communication session under simple IP.

19. The apparatus of claim 17 wherein said memory circuit further including computer-readable instructions for updating said co-located care of address when said apparatus moves from the foreign network to a second foreign network in said communication system.

20. A non-transitory computer-readable medium comprising computer-executable instructions for:
(a) sending, from a mobile node located in a foreign network, signaling for initialization of a communication session through a first communication path by sending an invite message to a correspondent node in a remote network via a proxy entity associated with a home network of the mobile node, including sending the invite message via a home agent of the home network to a Proxy Call State Session Function (P-CSCF) of the home network; and
(b) transmitting contents of said communication session straightforwardly from said mobile node to said correspondent node through a second communication path, wherein the second communication path comprises a direct data path between the mobile node and the correspondent node without passing through the proxy entity.

21. The non-transitory computer-readable medium of claim 20 further including computer-executable instructions for acquiring first and second addresses prior to step (a), and wherein step (a) further including signaling for initialization of said communication session using said first address and step (b) further including transmitting said contents of said communication session using said second address.

22. The non-transitory computer-readable medium of claim 21 further including (c) updating said second address when the mobile node moves from the foreign network to another network in the communication system.

23. The non-transitory computer-readable medium of claim 22 wherein step (a) further including signaling for initiation of said communication session under mobile IP and step (b) further including transmitting contents of said communication session under simple IP.

24. The non-transitory computer-readable medium of claim 21 further including computer-executable instructions for providing a home address as said first address and providing a co-located care-of address as said second address.

25. The non-transitory computer-readable medium of claim 24 further including computer-executable instructions for updating said co-located care of address during said transmitting said contents in a second foreign network.

* * * * *